United States Patent [19]
Güttinger et al.

[11] 3,970,113
[45] July 20, 1976

[54] BIMETAL MULTIPLE CYLINDER FOR EXTRUDERS IN PLASTICS PROCESSING MACHINERY

[75] Inventors: Urs Güttinger, Hagendorf; Hans Hofer, Olten, both of Switzerland

[73] Assignee: Motorwagenfabrik Berna AG, Olten, Switzerland

[22] Filed: May 28, 1974

[21] Appl. No.: 473,896

[30] Foreign Application Priority Data
May 30, 1973  Germany............................ 2327684

[52] U.S. Cl................................. 138/157; 138/171; 425/204
[51] Int. Cl.²....................... F16L 9/00; F16L 9/22; B29B 1/04; B29F 3/02
[58] Field of Search................... 138/157, 171, 177; 425/204

[56] References Cited
UNITED STATES PATENTS

| | | |
|---|---|---|
| 1,934,065 | 11/1933 | Hermanson.......................... 138/151 |
| 2,698,962 | 1/1955 | Swallow................................ 425/204 |
| 3,010,151 | 11/1961 | Dickinson et al.................... 138/171 |
| 3,664,012 | 5/1972 | Wilke et al. ......................... 29/597 |

OTHER PUBLICATIONS

*Welding Handbook,* section 2, American Welding Society, Sixth Ed., Appendix pp. 11, 23 & 31.

*Primary Examiner*—Richard E. Aegerter
*Assistant Examiner*—Steven L. Stephan
*Attorney, Agent, or Firm*—Brooks Haidt Haffner & Delahunty

[57] ABSTRACT

A bimetal multiple cylinder for extruders in plastics processing machinery is formed of a plurality of cutaway bimetal tubes having each a base material supporting an internal lining. The bimetal tubes are each cut-away by a pair of longitudinal cuts extending from the tube exterior to the tube interior to expose a pair of cut faces, and the cut faces are each arranged to face a respective cut face of an adjacent cut-away bimetal tube. Adjacent cut-away bimetal tubes are joined to one another by welding at their facing cut faces.

18 Claims, 10 Drawing Figures

Fig. 1
Fig. 1a
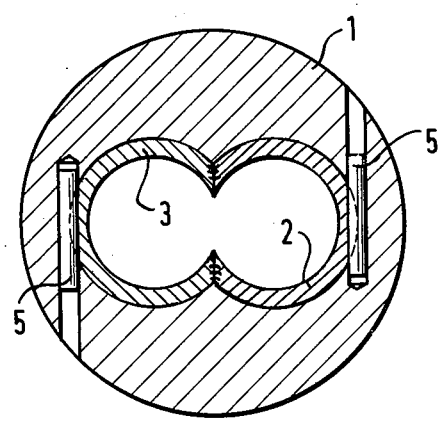
Fig. 1b
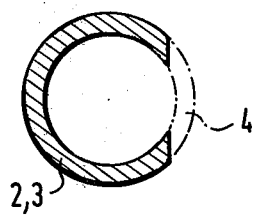
Fig. 2
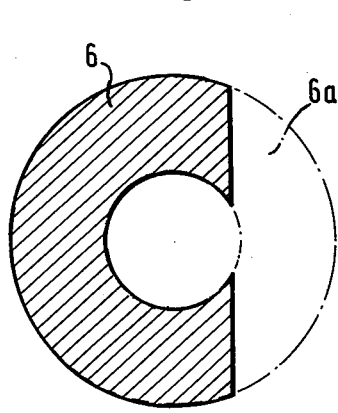
Fig. 3
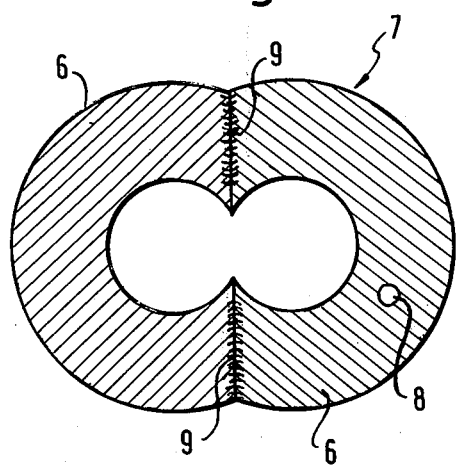

Fig. 4
Fig. 4a
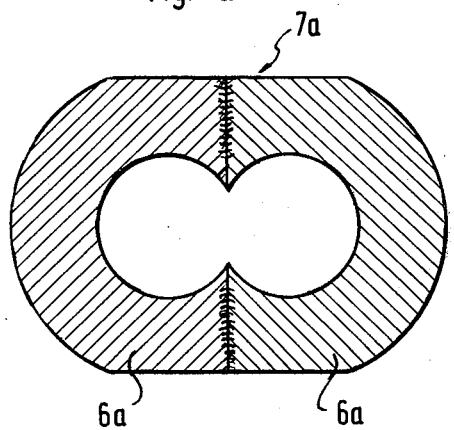
Fig. 4b
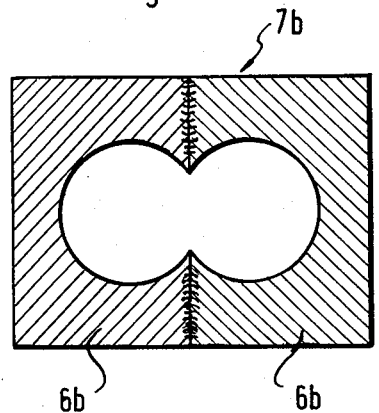
Fig. 4c
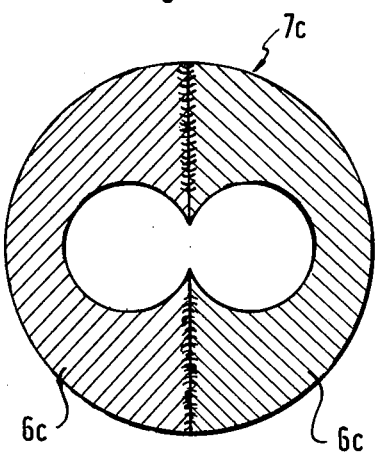
Fig. 4d
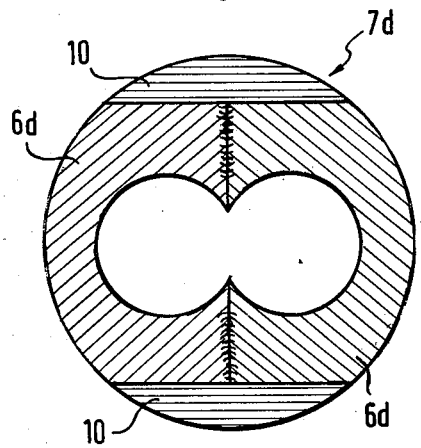

BIMETAL MULTIPLE CYLINDER FOR EXTRUDERS IN PLASTICS PROCESSING MACHINERY

The invention relates to a bimetal multiple cylinder, particularly for extruders in plastics processing machinery.

Besides using single screw extruders for processing synthetic plastics compositions the plastics industry very successfully makes use also of twin screw and multiple screw extruders. Owing to the development of reinforced plastics the problems of wear present ever increasing difficulties.

Whereas for reducing cylinder wear in single screw extruders the cylinders are now more and more widely being successfully linered with hard metal tubes, these linered cylinders being known as bimetal cylinders, a satisfactory solution has not hitherto been found for twin screw and multiple screw (including twin screw) extruders in which extruder screws are mounted in the parallel bores of a multiple cylinder which merge with one another.

In the majority of conventional twin screw and multiple screw extruders, the multiple cylinders are produced by first boring out solid round sections of steel. After finish-machining, the bores are submitted to surface hardening, for instance by mitriding, to provide a hard internal cylinder surface that is resistant to wear.

However, the degree of wear resistance thus achieved is not always entirely satisfactory. Twin extruder cylinders have sometimes been internally lined with wear-resistant alloys, for instance by the spray deposition of hard materials, e.g. by plasma spraying or hard facing. In view of the technical problems involved in these methods, however, it has been possible to use them only occasionally, and the promise of further improvement has not been fulfilled.

In order to permit the very satisfactory idea of the bimetal cylinder to be applied to twin and multiple screw extruders attempts have been made to insert bimetal liners into steel multiple cylinders having merging parallel bores bored out from the solid. These liners may be tubes having a side cut away and then welded together (e.g. in figure-of-eight form for a twin-screw extruder) before being inserted into the bores. Alternatively the cut tubes may be separately pushed into the bores and then welded to the solid steel cylinder, or secured against axial movement by pins.

This arrangement already offers considerable advantages but it is nevertheless not entirely satisfactory firstly because of the high cost of the product which arises from the considerable amount of machining and the very accurate fits that are required, and secondly because in course of time, if heavily loaded, the liner may shift, damage the pins, and then cause extra heavy wear or even actual damage to the rest of the extruder. Moreover, a liner generally does not everywhere make perfect contact with the cylinder and so heat exchange can be locally poor, giving rise to processing faults.

It is an object of the present invention to avoid the aforementioned shortcomings of prior art devices.

According to the invention this is achieved by the provision of a bimetal multiple cylinder for extruders in plastics processing machinery comprising a plurality of cut-away bimetal tubes formed each of a base material supporting an internal lining, said cut-away bimetal tubes each being a remaining portion of a bimetal tube from which a part has been cut away by a pair of longitudinal cuts extending from the tube exterior to the tube interior to expose a pair of cut faces, each cut face being arranged to face a respective cut face of an adjacent cut-away tube, and adjacent cut-away bimetal tube portions being joined to one another by welding at their facing cut faces.

The walls of the bimetal cylinder segments to be welded together have such a degree of thickness, that they are able to withstand the great pressure and distortion forces, even without having an external supportive housing.

The bimetal cylinder segments are preferably welded together by means of electron-beam welding, by which thick walled cross sectons of up to 150 mm depth may be welded together relatively free of stress with only a 0.5 to 2 mm wide zone of thermal influx and with very slight distortion.

Since the multiple cylinder is subject to great internal pressure when in service, outer tensile stresses and inner compressive stresses (i.e. in the region of the saddle or internal junction point) prevail in the junction plane of both bimetal cylinder tubes. In welding the bimetal cylinder tubes, it must in any case be ensured that the welding depth completely traverses the region of tensile stress plus a certain safety margin which is required due to the superimposed residual stress from welding. If the welded seam does not extend into the region of compressive stress, then as a result of the dynamic forces involved, micro-fissures could occur in the not clearly defined, notch-stress endangered welding root face, and these fissures could split further and lead to bursting of the multi-cylinder. Consequently the welding seam must not necessarily extend over the entire depth of the junction plane, but rather the welding depth may be limited so that no welding of the junction plane occurs in the area of the saddle. This is feasible for the following reasons: The essential junction line seal in the area of the saddle, wetted by the molten plastic, can be employed in a particular yet simple manner, by utilizing the special characteristic formation of the stress distribution of the massive bimetal cylinder block with residual compression stress in the saddle region. For this purpose it is necessary that residual compressive stresses prevail in the saddle-junction plane even in a relieved pressureless state of the interior of the multi-cylinder. This is attained in the external region through the residual tensile stresses from welding. Thus the sealing of the junction line in the saddle region is already ensured in the multi-cylinder when same is not acted upon by internal pressure, and improves in direct proportion to the degree of internal pressure. In this way no "pumpage" occurs in the junction plane region of the saddle, so that leakage of the molten plastic is avoided.

Practical tests have shown that as a result of this state of residual compressive stress, in corrosive media actually no corrosion was to be observed in the region of the saddle, since on the one hand the bimetal cylinder tubes welded as described, are securely pressed one against the other at the junction plane region of the saddle, i.e. their armored layers (integral lining) are pressed together, so that no fissure occurs through which the molten plastic could leak into the less corrosion resistant base metal of the bimetal cylinder tubes. On the other hand, the susceptibility to corrosion is fundamentally reduced by the described residual compressive stresses in the base metal and by the absence of micro-stresses from welding in this region.

In order, however, to attain increased protection against corrosion in the most corrosive media, a relatively soft earth metal foil having good sealing properties, e.g. tantalum or lead, or a corresponding coating can be inserted or applied, respectively, in the joint in the region of the saddle prior to welding, said foil or coating, respectively, causing an absolutely reliable joint face sealing under the residual compressive stress of welding. Naturally it is also possible to directly weld the armored layers in the region of the saddle.

Due to the rigidity of the cylinder tubes, electron beam welding of the thick walled bimetal cylinder tubes causes hardly any distortion. Since the welding depth only needs to extend to approximately one-half of the joint face depth, as explained above, the distance of the welding seam to the armored layer of the cylinder tubes is large enough so that no fissures could arise in the armored layer in the saddle region, or elsewhere. Following the electron-beam welding, the bimetal multi-cylinder according to the invention requires only insignificant external finishing. In addition, the bimetal multi-cylinder according to the invention is of higher design strength, following from the aforementioned reasons.

Moreover, the bimetal multi-cylinder according to the invention is distinguished by good and uniform thermal flow which is absolutely necessary, particularly for the extrusion of plastics processing machinery. A uniform wall thickness is produced all-around thus permitting an optimal thermal flow.

By way of example the accompanying drawings illustrate, in schematic form, some preferred embodiments of the invention and a multiple cylinder and liner of the prior art. In the drawings:

FIGS. 1 (a) and (b) are cross-sections respectively of an experimentally constructed multiple cylinder and part of a liner therefor;

FIG. 2 is a cross-section of a bimetal cylinder cut for use in making the multiple cylinder of a twin-screw-extruder;

FIG. 3 is a cross-section of a bimetal multiple cylinder made from two bimetal cylinders cut as shown in FIG. 2;

Figure 5A:
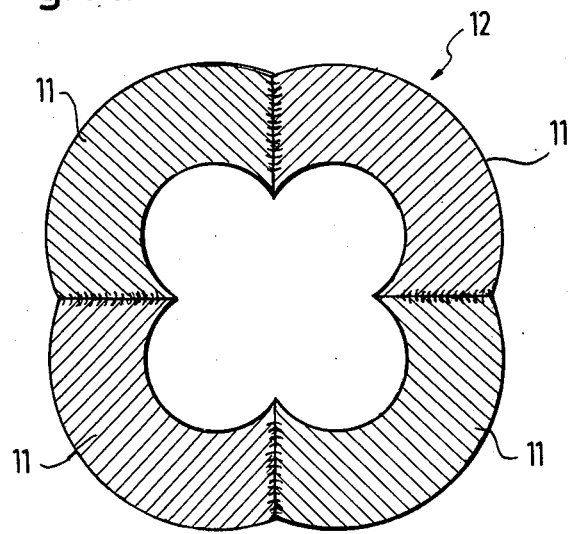

FIGS. 4 (a) to 4 (d) are cross-sections of four modified bimetal multiple cylinders similar to that of FIG. 3; and FIGS. 5 (a) and 5 (b) are cross-sectons of bimetal multiple cylinders of quadruple and triple screw extruders respectively.

Referring now to FIG. 1, the experimentally constructed multiple cylinder of a multiple screw extruder is formed by a solid bar 1 of steel within which there is a pair of siamesed parallel bores. The bores are lined by a pair of bimetal liners 2, 3, each of which is a thin walled tube with one side, 4, milled away as shown in FIG. 1(b). Before insertion into the siamesed bores of the multiple cylinder, the liners 2, 3 are welded together with deposited weld metal in the general form of a figure of eight and they are secured against axial displacement by pins 5.

Multiple cylinders made in accordance with the present invention differ from that shown in FIG. 1 particularly in that they are formed of a plurality of bimetal cylindrical tubes 6 such as illustrated in FIG. 2. Each bimetal tube 6 is formed of an outer shell of a base material which may be tempered or high tensile steel, or a corrosion resistant steel, and an inner lining of a corrosion resistant and/or wear resistant alloy.

The tube 6, which has a wall of adequate thickness, is cut away in the required manner as indicated at 6' and the exposed cut faces are ground to lie in a single plane. Two such cylindrical bimetal tubes 6 are then assembled as shown in FIG. 3 in a suitable rig to form a bimetal twin cylinder generally indicated by 7. The two parts 6 are then joined together by welding, and preferably this is done by using electron guns or by fusion welding to avoid distortion.

The resultant bimetal twin cylinder of only two components which is thus obtained possess the outstanding wear resistance of conventional bimetal cylinders without suffering from the afore mentioned shortcomings of prior arrangements. Moreover, owing to the small number of steps involved in their production they can also be made very economically.

The bimetal twin cylinder 7 shown in FIG. 3 has the further advantage that the radial wall thickness of the individual cylinders is uniform and thus provides a more even and more easily controlled transfer of heat when being cooled or when being heated.

The bimetal multiple cylinder 7 may be provided with bores 8 for a heat transfer medium as shown in FIG. 3.

Should there be any risk of corrosion, the joint 9 between the two cylindrical tubes 6 forming the bimetal twin cylinder 7 may be welded on the inside of the tubes to prevent corrosive fluids from penetrating and causing corrosion from behind the lining.

The bimetal twin cylinder 7 formed by welding together two cylindrical tubes 6 can be further machined to any desired external shape, as illustrated in FIGS. 4 (a) to (c). The bimetal twin cylinder 7a composed of the cylindrical bimetal tubes 6a is obtained simply by milling or turning metal off the exterior of the bimetal twin cylinder 7. The same applies to the bimetal twin cylinder 7b of rectangular cross-section composed originally of cylindrical bimetal tubes 6b. FIG. 4c shows a bimetal twin cylinder 7c of circular exterior composed of two tubes 6c.

FIG. 4d is a bimetal twin cylinder 7d having a cylindrical exterior and composed of two tubes 6d. The external shape of this cylinder has been partly achieved by the addition of fillets 10. applied, for instance, by build-up spraying.

Figure 5B:
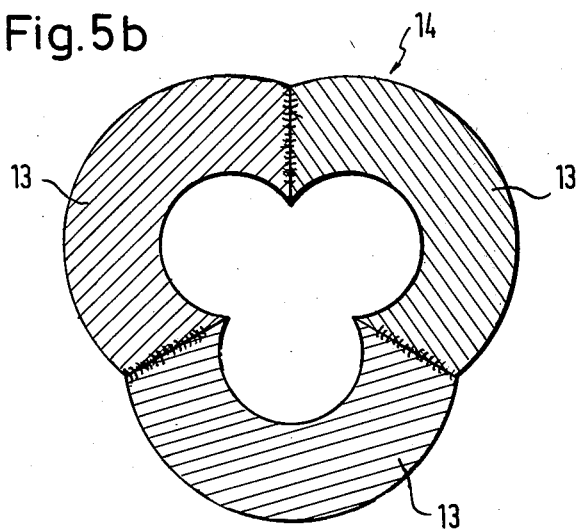

FIGS. 5a and 5b show two other configurations of bimetal multiple cylinders. FIG. 5a is a bimetal guadruple cylinder 12 composed of four cylindrical bimetal tubes. FIG. 5b is a bimetal triple cylinder 14 composed of three cylindrical bimetal tubes 13.

The illustrated basic shapes may naturally be modified as may be desired, i.e. the bimetal cylinders may be fitted with flanges, charging openings and so forth. In view of the available freedom of design, arrangements for heating and cooling can be readily devised.

The described invention results in bimetal multiple cylinders of outstanding wear resistance, and whose service life may be several times longer than those of hitherto known forms of construction.

It will be understood that the description of the present embodiments is given for the purposes of illustration only and that the invention can be embodied in other forms within the spirit and scope of the appended claims.

We claim:

1. A bimetal multiple cylinder for extruders in plastics processing machinery comprising a plurality of longitudinally extending, cut-away, bimetal tubes mounted adjacent each other and with their longitudinal axes spaced from and substantially parallel to a common axis, each of said tubes being unitary and having an outer base metal supporting an inner metal lining, the outer base metal being of high strength to withstand distortion and provide strength, rigidity, and stability so that said multiple cylinder requires no external jacket in use and the inner lining being metallurgically bonded to and integral throughout with the outer metal and having greater wear resistance than said outer metal, each said tube having a longitudinally extending slot from the exterior to the interior thereof which is adjacent said common axis and having a pair of faces, one on each side of said slot, extending longitudinally and outwardly from said common axis; each said tube being mounted with one face thereof contacting a face of a next adjacent tube and with the other face thereof contacting another face of a next adjacent tube and said tubes being welded together by welds between the contacting faces formed by metal of the tubes themselves and extending both from adjacent the innermost extents of said faces outwardly of said common axis to the outermost extents of said faces and extending longitudinally along said faces.

2. A cylinder as claimed in claim 1 wherein said inner lining is a corrosion resistant alloy.

3. A cylinder as claimed in claim 1 wherein said inner lining is a wear resistant alloy.

4. A cylinder as claimed in claim 1 wherein said outer metal is tempered steel.

5. A cylinder as claimed in claim 1 wherein said outer metal is high tensile steel.

6. A cylinder as claimed in claim 1 wherein said outer metal is corrosion resistant steel.

7. A cylinder as claimed in claim 1 wherein said welds extend from a point spaced from the innermost extents of said faces to the outermost extents of said faces.

8. A cylinder as claimed in claim 1 wherein said faces are welded together at the innermost extents thereof.

9. A cylinder as claimed in claim 1 wherein the innermost portions of said faces are free of said welds.

10. A cylinder as claimed in claim 9 wherein said welds extend inwardly from the outermost extents of said faces for a distance at least equal to one-half the distance between the innermost and outermost extents of said faces.

11. A cylinder as claimed in claim 1 wherein said cylinder is free of a peripherally continuous restraining member therearound.

12. A cylinder as claimed in claim 1 further comprising a layer of deposited metal on the exterior of said cylinder.

13. A cylinder as claimed in claim 1 wherein said outer metal has longitudinally extending bores for the passage of a heat transfer medium.

14. A cylinder as claimed in claim 1 wherein said welds are fused metal of said tubes.

15. A method of manufacturing a bimetal multiple cylinder comprising:
   cutting a plurality of unitary bimetal tubes longitudinally thereof so as to provide a longitudinally extending slot in each tube which extends from the exterior to the interior thereof and a pair of longitudinal faces, one on each side of said slot, which extend from the interior to the exterior of the tube each of said tubes being formed of outer metal of high strength and an inner metal lining of greater wear resistance than said outer metal metallurgically bonded and integral throughout with said outer metal
   placing said tubes adjacent each other with their axes substantially parallel and disposed in spaced relation with a common axis and with one face of each tube contacting a face of a next adjacent tube and with the other face of each tube contacting a face of a next adjacent tube, and
   welding the contacting faces together by fusing the metal of the contacting faces to form welds extending from the outermost extents of said faces toward the innermost extents thereof by at least one-half the distance between said inner and outer ends but less than said distance.

16. A method as claimed in claim 15 wherein said contacting faces are welded together by electron beam welding.

17. A method as claimed in claim 15 further comprising machining the exterior of said cylinder into the desired shape subsequent to said welding.

18. A method as claimed in claim 15 further comprising building-up the exterior of said cylinder by depositing metal on the exterior thereof subsequent to said welding.

* * * * *